May 12, 1931. J. R. KOVAR ET AL 1,805,286
HARROW HAVING SPRING TEETH
Filed Sept. 14, 1927   2 Sheets-Sheet 2
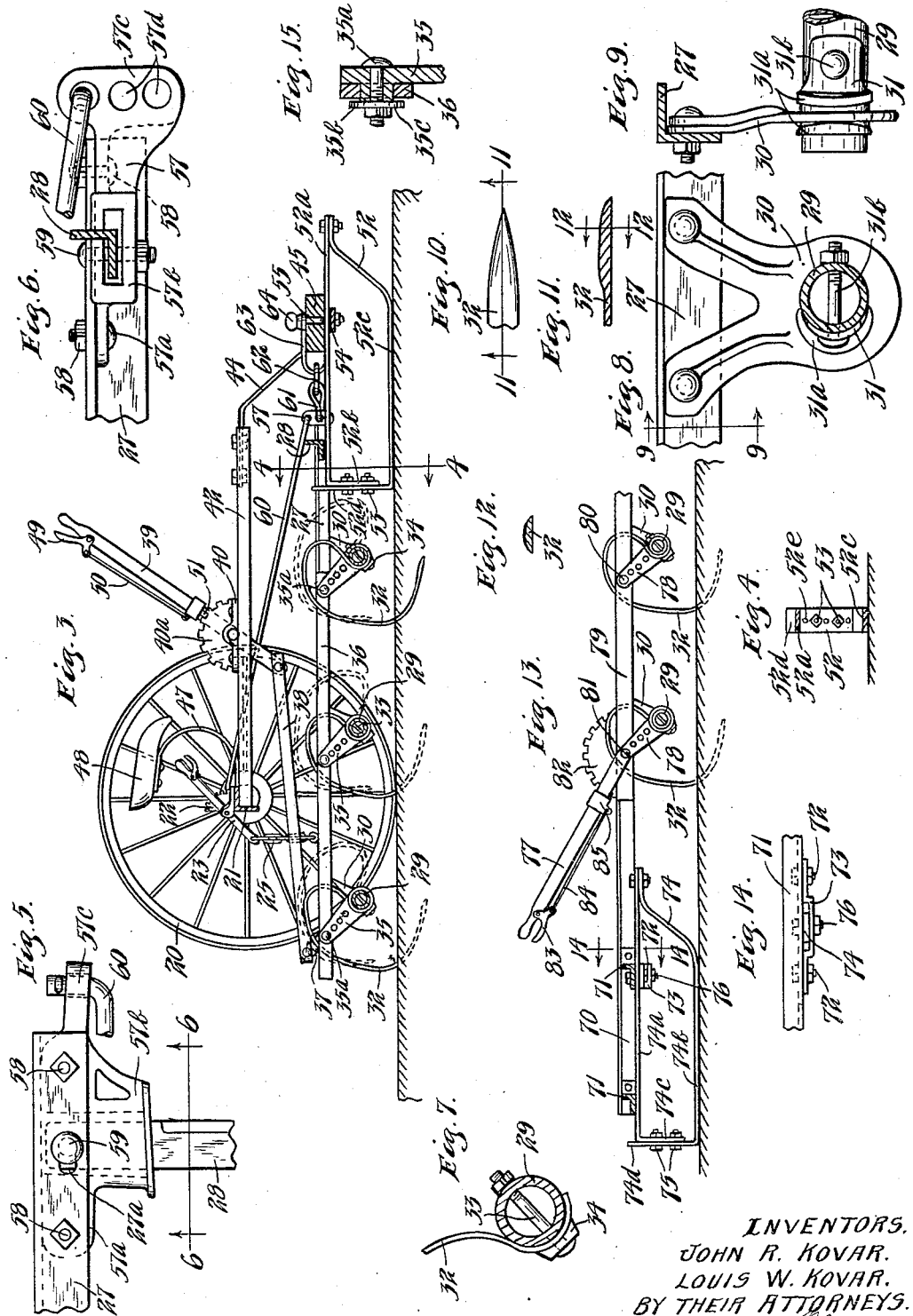
INVENTORS.
JOHN R. KOVAR.
LOUIS W. KOVAR.
BY THEIR ATTORNEYS.

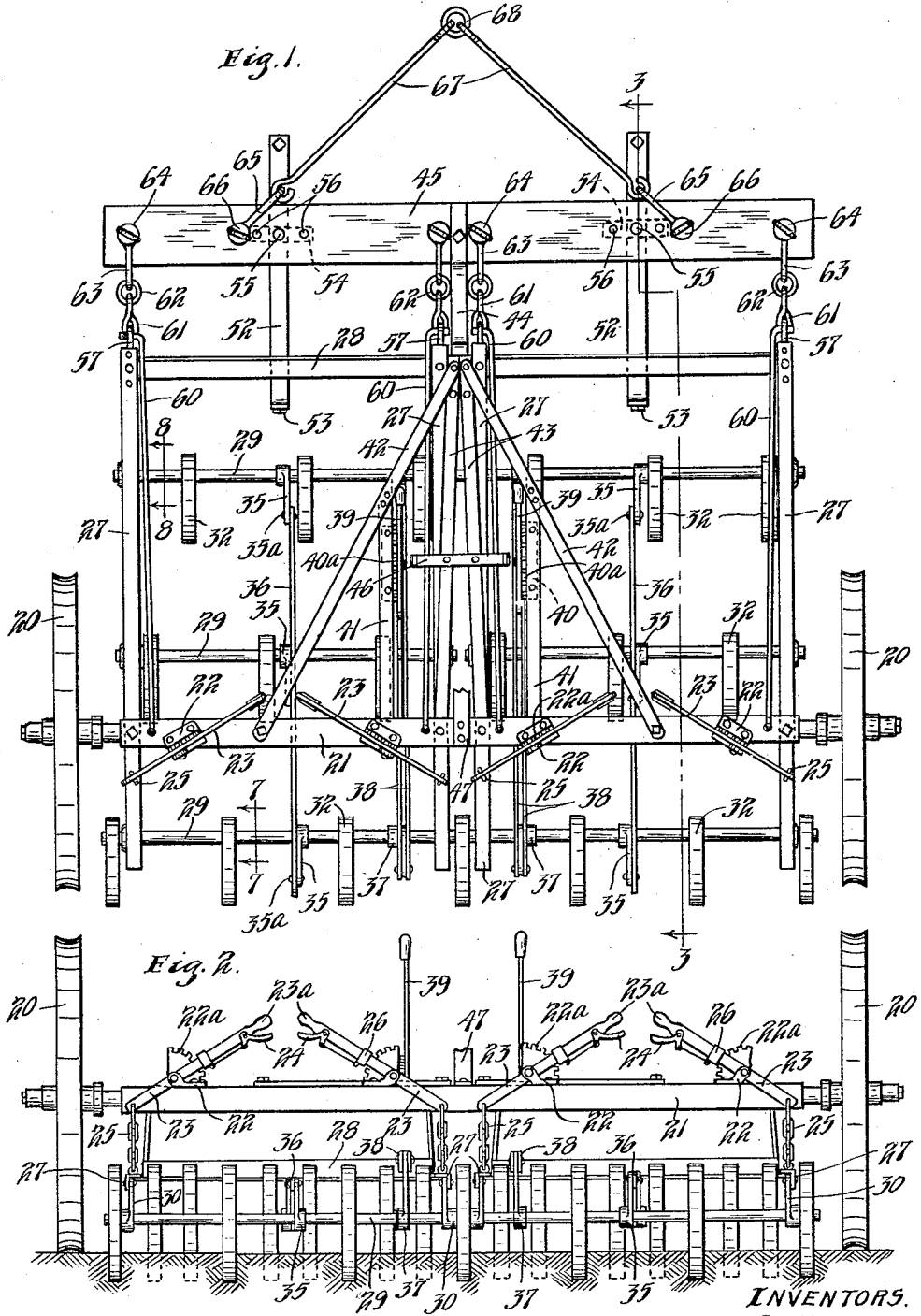

Patented May 12, 1931

1,805,286

UNITED STATES PATENT OFFICE

JOHN R. KOVAR AND LOUIS W. KOVAR, OF OWATONNA, MINNESOTA, ASSIGNORS TO JOSEPH J. KOVAR COMPANY, OF OWATONNA, MINNESOTA, A CORPORATION OF MINNESOTA

HARROW HAVING SPRING TEETH

Application filed September 14, 1927. Serial No. 219,424.

This invention relates to a harrow, and while many of the features of the invention may be used on various types of harrows, the invention as illustrated is applied to a spring tooth harrow.

It is an object of this invention to provide a harrow having one or more sections which are flexibly supported by a pair of wheels at one end and have vertically adjustable supports at the other end.

It is another object of the invention to provide a harrow comprising one or more sections having a tie bar at the forward end, to which said sections are flexibly connected, and having vertically adjustable means for supporting both the forward and rear ends of said sections.

It is also an object of the invention to provide a harrow comprising one or more tooth-carrying sections, a tie bar at the forward end of said harrow to which said sections are flexibly connected, and runners pivotally connected to said tie bar supporting the forward ends of said sections, said runners preferably being vertically adjustable so that said sections may be raised and lowered relative to the ground.

It is still another object of the invention to provide an improved and efficient form of harrow tooth which is very durable in operation.

These and other objects and advantages of the invention will be fully set forth in the following description made in connection with the accompanying drawings, in which like reference characters refer to similar parts throughout the several views and in which:—

Fig. 1 is a plan view of the harrow;

Fig. 2 is a rear view thereof, with some parts broken away;

Fig. 3 is a view in vertical section taken on line 3—3 of Fig. 1, as indicated by the arrows;

Fig. 4 is a vertical section taken on line 4—4 of Fig. 3, as indicated by the arrows;

Fig. 5 is a partial plan view of the front portion of the harrow shown on an enlarged scale;

Fig. 6 is a vertical section taken on line 6—6 of Fig. 5, as indicated by the arrows;

Fig. 7 is a vertical section taken on line 7—7 of Fig. 1, as indicated by the arrows;

Fig. 8 is a vertical section on line 8—8 of Fig. 1 showing the side of one of the rock shaft bearings used;

Fig. 9 is a vertical section taken on line 9—9 of Fig. 8;

Fig. 10 is a plan view of the point of a harrow tooth used;

Fig. 11 is a vertical section on line 11—11 of Fig. 10 as indicated by the arrows;

Fig. 12 is a vertical section on line 12—12 of Fig. 11 as indicated by the arrows;

Fig. 13 is a partial view partly in side elevation and partly in vertical section showing a modified form of the harrow, and Fig. 14 is a vertical section taken on line 14—14 of Fig. 13 as indicated by the arrows.

Fig. 15 is a sectional view showing the connection of the tooth swinging arm and link.

Referring to the drawings, a harrow is shown comprising the wheels 20 journaled on the ends of the axle 21 and while this axle may be made in various forms, in the embodiment of the invention illustrated it is shown in the form of an angle bar having wheel spindles at its ends. The axle 21 has bolted thereto a plurality of brackets 22, each comprising an upstanding gear segment 22a. Levers 23 are pivoted to said brackets 22 on said axle, having handle portions 23a to which are pivoted the pawl operating grips 24 having pawls 26 at their lower ends adapted to engage in the teeth of segments 22a. The other end of each of the levers 23 has secured thereto a chain 25 extending downwardly from axle 21 and secured at its lower end to the side bar 27 respectively extending at each side of the harrow sections. Each of said sections comprises a pair of side bars or drag bars 27 extending longitudinally of the harrow in parallel relation and connected by the cross bar 28 at their forward ends. While said bars 27 and 28 may be made in various shapes, in the embodiment of the invention illustrated they are also shown as in the form of angle bars. The side bars of each section are also connected by the rock shafts 29 which extend through brackets 70 which are bolted to and depend from said bars, said rock shafts being rotatable in said brackets. Each of the rock shafts 29 has secured to its end a saddle plate 31, as by the headed and nutted bolt 31b, the diameter of the apertures in the said brackets being considerably larger than the diameter of said rock shafts. The saddle plate 31 has a cylindrical surface at its inner side fitting the side of the rock shaft, but its outer surface is eccentric to the surface of said rock shaft. Said saddle plate also has flanges 31a receiving between them the web of said brackets 30. Each rock shaft 29 carries a plurality of curved spring teeth 32 secured thereto by having their ends bent around said shafts and fastened with bolts 33, which bolts extend through plates 34 shaped to fit said teeth on one side and having a flat surface on the other side. The teeth 32 are staggered on the various rock shafts 29 of each section so that the teeth will be drawn in lines substantially equal distances from each other. The rock shafts on each section have arms 35 secured thereto, the outer ends of which are pivotally connected to a longitudinally extending link bar 36. Each arm 35 has a knob or trunnion 35b over which link 36 fits, a washer 35c and pivot bolt 35a holding said link in place. Bolt 35a is of squared section adjacent its end and is non-rotatably received in arm 35. The rear rock shaft 29 of each section has arms 37 secured thereto and a pair of links 38 are connected to each side respectively of said arms and extend forwardly therefrom. Levers 39 are pivoted in brackets 40 and have their lower ends pivoted respectively between and to the links 38. Brackets 40 are mounted on angle bars 41 which are secured at their rear ends to axle 21 and extend forwardly therefrom, being secured at their forward ends to the angle bars 42. The bars 42 are also secured at their rear ends to axle 21 and converge forwardly therefrom to be secured at their forward ends to another pair of angle bars 43 which are also secured at their rear ends to the axle 21 and are secured at their front ends to a forwardly and downwardly extending flat bar 44 which latter extends horizontally at its front end and is pivotally secured to a tie bar 45 extending across the front of the machine. The bars 43 also have a transversely extending bar 46 secured thereto, forming a foot rest, and a bar 47 is secured at one end to the axle and is curved forwardly and upwardly and then rearwardly, and has a seat 48 secured to its upper end, said bar being somewhat resilient. The levers 39 have the grip members 49 pivoted thereto, connected by the rods 50 to pawls 51 which are adapted to seat in any one of a plurality of notches in the segment 40a of the brackets 40. The cross bars 28 rest upon the tops of runners 52 which are disposed substantially midway between the side bars 27 of each section and extend under and are pivotally connected to tie bar 45. The runners 52 each comprise a top bar 52a having a downwardly extending portion 52b at its rear end and a lower bar 52c having an upwardly extending portion 52d at its rear end, in contact with bar 52b. The bars 52b and 52d each have a series of holes 52e therein adapted to receive headed and nutted bolts 53. The bar 52d preferably has its free end extending a short distance above the top surface of bar 52a. The tie bar 45 has yoke shaped brackets 54 secured to its under surface, similar to that shown in Fig. 14, to be later described, having a central portion spaced from said tie bar and between which portion and bar 45 the top bar 52a of runner 52 is pivotally secured by a headed and nutted bolt 55 extending through said central portion and tie bar 45. Said yoke 54 is secured at each side of bolts 56 extending through the tie bar 45.

The side bars 27 have secured thereto at their forward ends, brackets 57, each of which has a rearwardly projecting lug 57a, which, together with the front of the bracket, is connected to the horizontal web of bar 27 by the headed and nutted bolts 58. The bracket has a laterally and inwardly projecting hollow portion 57b in which the horizontal web of cross bar 28 is received, the vertical web thereof being cut away adjacent the end of said bar. A headed and nutted bolt 59 extends through bar 27 and bracket 57 and laterally through the bar 28 whereby said bar has vertical movement on bolt 59. The bar 28 will usually occupy a position at the top or bottom of portion 57b, but in Fig. 6 it is shown in an intermediate position. A clevis portion 57c is formed at the front of bracket 57, having a plurality of vertically spaced holes 57d therein. Tie rods 60 extend from the top hole 57d in each clevis 57c rearwardly to the axle 21, said rods extending through holes in the horizontal web of said axle and being formed with hooks at their rear ends, said holes being adjacent the ends of said axle. The connected or hooked ends of tie rods 60 are loosely disposed in the holes 57d and the holes in the horizontal web of the axles, and thus may be said to be flexibly connected with the axles and the forward portions of the harrow sections. A link 61 extends through one of the other holes 57b and is connected by another link 62 to the rearwardly extending yoke or clevis 63 which embraces the tie bar 55 and is secured thereto by the headed and nutted bolt 64. The tie bar 45 also has secured thereto yokes or clevises 65 which embrace said bar from the front and are pivotally secured thereto by the headed and nutted bolts 66. Links 67 extend forwardly from yokes 65 and are connected at their forward ends by the ring 68 to which the draft means or traction means for the harrow will be connected.

The teeth 32 are formed of material which has considerable resiliency. These teeth are pointed at their forward ends as shown in Fig. 10. The wear on these teeth is considerable and to compensate for this wear and render the teeth more durable, the same are made of extra thickness adjacent their pointed portions as shown in Fig. 11. The teeth are also convex on their upper portions where they enter the ground as shown in Fig. 12.

In operation the harrow will be drawn over the ground by some traction means secured to ring 68. The levers 39 will be manipulated and the rock shafts 29 rotated to bring said rock shafts and teeth 32 into the desired working position and so that the teeth will enter more or less into the ground, said levers being held in position on the segments 40a. It will be seen from Fig. 3 that the levers 39 can be swung so that all of the teeth 32 are lifted well above the ground. The teeth are shown in these positions in dotted lines in Fig. 3. The harrow can be raised and lowered at its rear end by manipulation of levers 23 and said levers will be held in position by the pawls 26 engaging the segments 22a. The runners 52 can be adjusted to the desired height by adjustment of bolts 52. After being properly adjusted, the harrow will be drawn through the ground and it will be seen that the teeth 32 will travel at an even depth, and at an angle determined by levers 39 in paths which are parallel and substantially equi-distant. The runners 52 will have considerable swinging movement about the bolts 55, but will be limited in this movement by the sides of the bar 52a engaging the sides of the yoke member. Bars 52a and thus the runners, will have some vertical movement between the bottom of tie bar 45 and the top of the yoke member 33. This vertical movement will enable the runner to move over rough ground without unduly raising and lowering the harrow. The upwardly projecting end of portion 52d of the bar 52c prevents the rear end of the runner from swinging under the cross bar 28.

In the construction shown in Figs. 13 and 14, the side bars 27 are replaced by bars 70 which have rearward extensions connected by cross bars 71 also shown as angle bars, the forward bars 70 having bolted thereto by the headed and nutted bolts 72 a yoke member 73 having a depressed central portion. A runner 74 is provided having the upper bar 74a and the lower bar 74b. The bar 74a has the downwardly extending rear end 74c and the bar 74b has an upwardly extending rear end 74d, said portions 74c and 74d having a series of holes therethrough through which extend the headed and nutted bolts 75, said portions being thus adjustable so that the height of the runner can be varied. Bar 74d extends above the top of bar 74a and the rear end of the runner thus cannot swing under the rear cross bar 71. The runner is pivoted to the forward cross bar by a bar 74a passing beneath said cross bar and the top of the central portion of yoke 73, a headed and nutted bolt 76 passing through front cross bar 53 and the said yoke. The rock shafts 29 are carried in brackets 30 in the modification shown in Fig. 5 as already described. Said rock shafts 29 have the arms 78 secured thereto which are connected by a longitudinally extending link 79. The arms 78 have a plurality of holes therein, the top one of which receives the connecting pivot 80 for the links 79. The rear rock shaft 29 has secured thereto the lower end of the lever 77 having a hole adjacent its lower end, in which is received the pivot pin 81 connecting the same to the link 79, said lever being movable about said pivot 81 adjacent a toothed segment 82 also carried on link 79. The lever 77 has a grip 83 pivoted thereon connected by a link 84 to a pawl 85 adapted to be received in any one of the notches in segment 82.

It will be seen that the bars 79 can be raised and lowered by adjusting bolt 75 on the runner 74 and that the teeth 32 can be swung to various positions by moving the lever 77. When this lever is swung, the link 79 moves upwardly or downwardly therewith.

From the above description it is seen that applicants have provided a simple, rugged and efficient structure of harrow. The teeth are readily adjustable and the device is quite flexible. The pivoted runners enable the harrow to be turned in a comparatively small area and enable the device to accommodate itself to the ground worked. The sections can be vertically adjusted both at the front and rear so that the desired action on the ground can be had. The thickened portion of the teeth resists wear at the narrow points of the teeth as they move through the ground, thus rendering the teeth much more durable. The device has been amply demonstrated in actual practice and found to be very successful and efficient, and is being commercially made. Harrows having some structural features similar to the one herein disclosed and claimed are shown in applicants' co-pending applications, S. N. 283,542, filed June 7, 1928, and S. N. 316,390, filed November 1st, 1928.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. A harrow having in combination, a pair of tooth-carrying sections comprising a pair of spaced relatively movable drag bars, a tie bar to which said drag bars are flexibly connected for universal movement, and a runner pivotally connected to said tie bar for supporting each section when said sections are operating.

2. A harrow having in combination, a pair of wheels, an axle on which said wheels are journaled, a plurality of tooth-carrying sections disposed beneath and flexibly suspended from said axle, a tie bar at the front of said sections, means flexibly connecting said sections and tie bar and runners pivotally connected to said tie bar extending beneath and supporting the forward ends of said sections.

3. A harrow having in combination, a pair of wheels, an axle on which said wheels are journaled, a plurality of tooth-carrying sections disposed below and flexibly suspended from said axle, means on said axle for raising and lowering said sections, a tie bar extending across the front of said sections, means connecting said tie bar and sections, and runners pivotally connected to said tie bar extending beneath, engaging and supporting the forward ends of said sections.

4. A harrow including a pair of sections each comprising a pair of substantially parallel relatively movable drag bars and tooth-carrying members extending between and flexibly connecting the same, a tie bar at the forward end of said harrow, and caster-acting runners pivotally secured to said tie bar by vertical pivots and supporting the same and extending beneath, engaging and supporting the forward ends of said sections.

5. A harrow having in combination, a tooth-carrying section, a tie bar extending across the front of said section to which it is flexibly connected, a runner having top and bottom bars, the top bar of which is pivotally connected to said tie bar and which supports said section at its rear end, and means for adjusting said top and bottom bars to vary the height of said runner and section.

6. A harrow having in combination, a pair of tooth-carrying sections each having a transversely extending bar at their forward ends, a tie bar at the forward end of said sections to which they are flexibly connected, runners pivotally connected to said tie bar having rearwardly extending portions on which said transverse bars rest, said runners having upwardly extending bars at their rear ends preventing said runners from swinging under said transversely extending members.

7. A harrow having in combination, a tie bar, a yoke secured to said tie bar having a central portion beneath and spaced therefrom, a runner having a bar extending between said tie bar and portion and pivotally connected to said tie bar by a pivot extending through the same and said yoke whereby said tie bar is supported on said runner.

8. A harrow having in combination, a tooth-carrying section, a tie bar extending across the front of said section to which it is flexibly connected, a runner having top and bottom bars, a bracket secured to said tie bar having a central portion beneath and spaced from said tie bar between which and said tie bar said top bar of said runner extends, and a pivot connecting said tie bar and top bar, the front end of said section resting on said runner.

9. A harrow having in combination, a tooth carrying section comprising a pair of spaced drag bars and tooth carrying members extending therebetween and flexibly connected thereto, a tie bar extending across the front of said section to which drag bars are flexibly connected, a runner pivotally secured to said drag bar extending beneath said section for supporting the forward end of said section, means for adjusting the height of said runner, a wheel supported axle extending over said sections, adjustable means carried by said axle and flexible members connecting said means and the rear portion of said drag bars.

10. A harrow having in combination, a wheel supported axle, a tooth carrying section comprising spaced drag bars disposed beneath said axle, flexible members supporting the rear ends of said drag bars from said axle and rods connected to said axle and extending downwardly and forwardly to the forward ends of said drag bars.

11. A harrow having in combination, a wheel supported axle, a tooth carrying section disposed below said axle, flexible means supporting the rear portion of said section from said axle and rods flexibly connected to said axle extending downwardly and forwardly therefrom and flexibly connected to the forward portion of said section.

In testimony whereof we affix our signatures.

JOHN R. KOVAR.
LOUIS W. KOVAR.